D. Lasher,

Piston Packing.

No. 606. Reissued Sep. 28, 1858.

Inventor:

Witnesses:

Lemuel W. Serrell

Thomas G. Harold

Daniel Lasher

N. PETERS. PHOTO-LITHOGRAPHER, WASHINGTON, D. C.

UNITED STATES PATENT OFFICE.

DANIEL LASHER, OF BROOKLYN, NEW YORK.

IMPROVEMENT IN METALLIC PACKING FOR STEAM-PISTONS.

Specification forming part of Letters Patent No. 17,683, dated June 30, 1857; Reissue No. 606, dated September 28, 1858.

*To all whom it may concern:*

Be it known that I, DANIEL LASHER, of Brooklyn, in the county of Kings and State of New York, have invented, made, and applied to use a certain new and useful Improvement in Metallic Packings for Steam-Pistons; and I do hereby declare that the following is a full, clear, and exact description of the construction and operation of the same, reference being had to the annexed drawings, making part of this specification, wherein—

Figure 2:
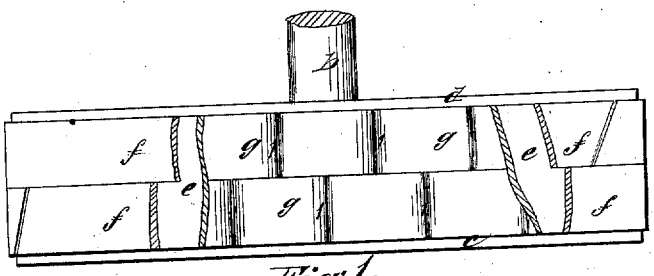
Figure 1:
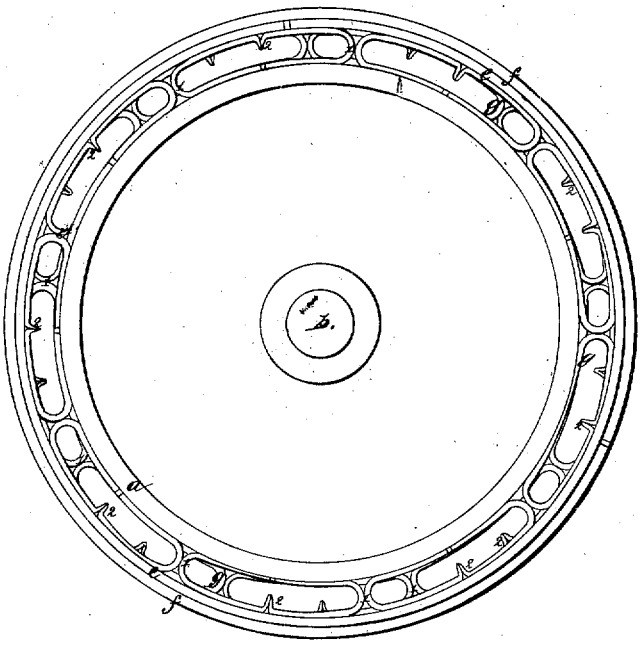

Figure 1 is a plan of a steam-piston with the cap moved to show the metallic packings, and Fig. 2 is a side elevation of the piston with the exterior packing-rings shown as broken open to represent the interior springs.

Similar marks of reference denote the same parts.

It has heretofore been customary to introduce behind the packing-rings in steam-engines, between that and the piston, a packing of hemp or other fibrous or elastic substance to cause the rings to take a proper bearing on the interior of the cylinder. Metallic packings for pistons have also been made by the use of springs in an elliptic form, taking a bearing at one or two points only on the packing-ring and on the piston; but I have found that in consequence of said bearing being so small the packing-rings would be worn away thinner at said points, and the cylinder also would be worn out of true at the corresponding points. Bent or folded springs setting into each other and touching the rings and piston at the ends have also been used. Their practical operation, however, is the same as before specified, producing more pressure of one part of the ring than another, which makes the rings and cylinder to wear untrue, and, besides this, the said springs from their shape are subject to lose their elasticity, as well as to change their position.

To obviate the above-named difficulties it is necessary that there should be such a combination of springs and rings as will secure pressure of the springs upon a larger part of the ring than has been accomplished by the old plans. To attain that end I have devised a spring which takes an even and extended bearing on the inner side of the packing-ring, so as to cause as nearly as practicable a continuous line of uniform pressure upon the inner surface of the ring and around the whole circumference of it, and when a series of these springs are placed around the piston between that and the packing-rings they act with such uniformity upon the rings that they are kept with an equal pressure at all points to the interior of the cylinder, and so remain operative until the rings are worn out. I am thus enabled to effect a great saving in friction, because my springs, acting on an extended surface, keep the rings tightly against the cylinder with but little force, instead of requiring more power acting at distinct points, and thereby causing an unnecessary friction and wear at said points; and my springs act with more uniformity than hemp or other elastic packings that have heretofore been used, and which are generally preferred to elliptic and similar springs, and my springs keep the packing-rings to the cylinder until worn out, thus avoiding the cost and trouble of constantly repacking the piston in the manner necessary where elastic materials are used; and, besides this, the pressure of the ring on the cylinder being more uniform by the use of my springs, much less tallow or other lubricating material is necessary than with any other packing I am acquainted with.

In the drawings, *a* is the piston; *b*, the piston-rod; *c*, the fixed, and *d* the movable, flanges or head, leaving the space, as usual, for the packings and for the full metallic packing-ring *e* and its two exterior rings, *f f*, all of which are formed with the split or opening, as usual.

*g* are my improved springs, set between the packing-rings and piston. Each of these springs *g* is so bent and curved that one arm of the spring sets against the piston and the other takes a bearing on the inside of the ring *e*. (See Fig. 1.)

1 is the point at which the springs are bent around, and 2 is a lip or projection formed on the end of one arm, which, taking a similar projection or lip on the adjoining spring, effectually prevents the springs working around or changing their place.

I make use of two or more tiers of springs, according to the thickness of the piston, and arrange the same in the alternate positsion shown in Fig. 2, so as to break joints and cause the most even bearing on the ring *e*.

I do not claim an elliptic spring bearing at its center and ends, nor a bent or folded spring bearing at its ends, nor a folded spring made thin at the bend and set in a position parallel to the axis of the cylinder around the piston, with the bend of one spring against the follower and that of the next against the other follower, as all these devices have before been used, and in many instances have proved a failure; but

What I claim as my invention, and desire to secure by Letters Patent, is—

1. The bent or folded springs inserted between the piston and packing-ring, and taking an even and extended bearing around the interior circumference of said packing-ring, to cause the said packing ring or rings to take a uniform bearing on the interior of said cylinder, substantially as set forth.

2. Two or more tiers of packing-springs placed between the piston and the rings, as aforesaid, when the said tiers of springs are so placed as to occupy alternate positions or break joints, as set forth.

In witness whereof I have hereunto set my signature this 21st of August, 1858.

DANIEL LASHER.

Witnesses:

LEMUEL W. SERRELL,
THOMAS G. HAROLD.